United States Patent
Batra et al.

(10) Patent No.: US 12,278,477 B2
(45) Date of Patent: Apr. 15, 2025

(54) ELECTRICAL NETWORK

(71) Applicant: Siemens Aktiengesellschaft, Munich (DE)

(72) Inventors: Shivansh Batra, Schwieberdingen (DE); Thomas Beckert, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 188 days.

(21) Appl. No.: 17/911,444

(22) PCT Filed: Sep. 9, 2020

(86) PCT No.: PCT/EP2020/075200
§ 371 (c)(1),
(2) Date: Sep. 14, 2022

(87) PCT Pub. No.: WO2022/053131
PCT Pub. Date: Mar. 17, 2022

(65) Prior Publication Data
US 2023/0099409 A1    Mar. 30, 2023

(51) Int. Cl.
*H02H 3/36* (2006.01)
*H02H 1/00* (2006.01)

(52) U.S. Cl.
CPC ............ *H02H 3/36* (2013.01); *H02H 1/0007* (2013.01)

(58) Field of Classification Search
CPC .... G06F 1/26; G06F 1/266; H02J 1/04; H02J 1/02; H02J 1/084; H02J 1/08; H02H 3/00; H02H 3/36; H02H 1/0007; H02H 3/381; H02H 2300/24; Y02E 10/56
USPC ...................................... 361/62–69
See application file for complete search history.

(56) References Cited

U.S. PATENT DOCUMENTS

| | | |
|---|---|---|
| 2011/0266876 A1 | 11/2011 | Lauinger et al. |
| 2014/0002943 A1 | 1/2014 | Berggren et al. |
| 2014/0240880 A1* | 8/2014 | Chen .................... H02J 1/00 361/62 |
| 2020/0119548 A1 | 4/2020 | Haugan |
| 2020/0313423 A1* | 10/2020 | Pan .................... H02H 7/267 |

* cited by examiner

*Primary Examiner* — Danny Nguyen
(74) *Attorney, Agent, or Firm* — Laurence A. Greenberg; Werner H. Stemer; Ralph E. Locher

(57) ABSTRACT

An electrical network includes feed-in means, loads, and a distribution network located therebetween which includes at least one dynamic isolator and busbars. The feed-in means and the loads together with associated busbars are disposed in groups which can be electrically interconnected or disconnected by the at least one dynamic isolator. The at least one dynamic isolator monitors the voltage on the busbars adjacent thereto for a voltage difference. In a normal state without a voltage difference, the at least one dynamic isolator electrically disconnects the groups from one another, and in the event of a voltage difference between the busbars adjacent thereto, the at least one dynamic isolator electrically connects the groups to one another.

10 Claims, 4 Drawing Sheets

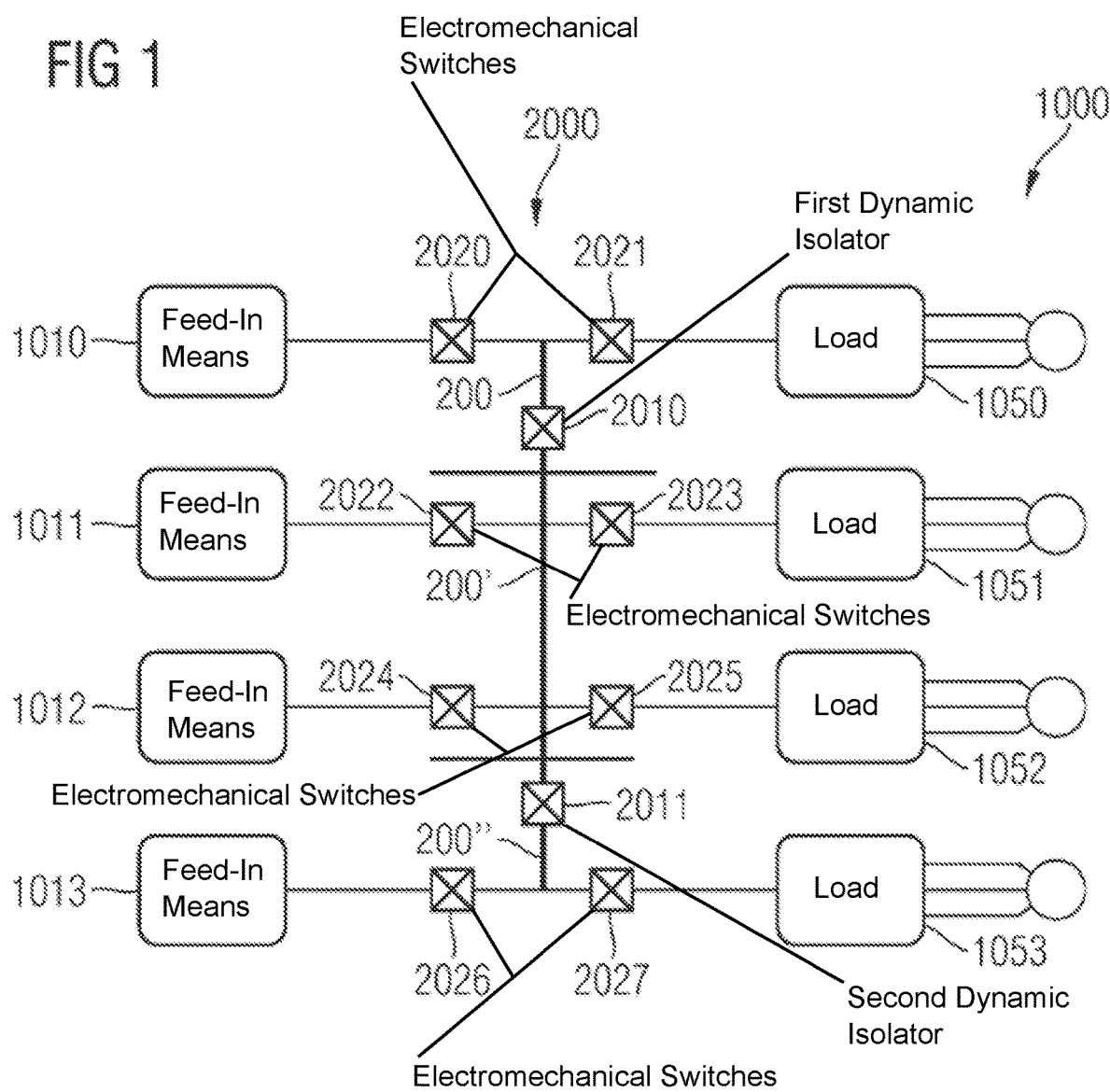

ELECTRICAL NETWORK

FIELD AND BACKGROUND OF THE INVENTION

The invention relates to an electrical network.

Direct current (DC) networks, consist of feed-in means and loads. Such DC networks are increasingly popular since conversion losses are minimized. The energy efficiency is increased by virtue of it being necessary to convert direct current/alternating current just once for all motors instead of performing a conversion for each motor. Additionally, the losses in DC networks are very low since the frequency is zero (0 Hz) and there are no impedance losses, but rather only resistive losses. A further advantage of DC networks is that there is no skin effect on account of the zero frequency (0 Hz); it is therefore possible to use cables with relatively small cross sections at relatively low costs, for example.

Any type of feed-in means can be used in a typical DC network. By way of example, renewable energy sources such as photovoltaics or wind turbines can be used as feed-in means or batteries or flywheels or alternating current (AC) systems with AC-DC converters can be used as backup resources. Each feed-in means uses a converter, either AC-DC or DC-DC for different DC voltages. In order to obtain a virtually constant direct current (constant DC voltage) without fluctuations, DC link capacitors are typically used directly after the converters on the DC side. Each converter is therefore typically connected to a DC link capacitor, and such a system is referred to as a DC link.

The AC-DC converter in a DC system can be either of unidirectional (rectifier) or bidirectional (for example in active front end technology) construction. Uncontrolled rectifiers in the unidirectional mode typically consist of diodes or active front ends (AFEs), which consist of IGBTs and diodes. A current cannot flow from the DC side to the AC side when the active front end (AFE) is switched off, which is prevented by freewheeling diodes. The fact that current can flow from the AC side to the DC side is not prevented by the diode arrangement when the DC side has a lower voltage than the AC side. The active front end (AFE) in the switched-off state therefore corresponds to a three-phase uncontrolled rectifier.

The feed-in means are typically connected to a busbar. The loads are supplied with power from the feed-in means via a common busbar.

Electric motors that require an AC supply are generally considered as electrical loads, for which reason extra DC-AC converters are required for each motor on the load side. Each converter is in turn connected to a DC link capacitor in order to maintain a constant voltage. Further capacitors are therefore located upstream of the DC-AC converters (inverters).

Power electronic converters that are used to convert power typically operate at high switching frequencies. This causes them to produce noise that is also referred to as total harmonic distortion (THD). This noise worsens the quality of the current and/or the voltage on the feed-in side. In order to solve this problem, what are known as EMC (electromagnetic compatibility) filters are used, which use differential-mode capacitors to improve the THD value. Common-mode capacitors provide a low-impedance path for a common-mode current that would otherwise flow to the transformer star and induce a fault current without there being a fault. In such a case, the fault current cannot be distinguished from a leakage current or ground fault.

A common-mode capacitor is therefore typically used together with a power converter to increase the current quality and to limit the leakage current in such a way that the current has to flow through the common-mode capacitor instead of otherwise flowing to the transformer star, whereby a fault current would be produced. If EMC filters are not used, the power conversion would produce electromagnetic distortions at other devices and could therefore disrupt normal operation. For these reasons, not using an EMC filter should be avoided.

Common-mode currents that flow during normal operation are known as leakage currents. The main reason for these leakage currents are the parasitic capacitors that exist throughout the system. Therefore, all non-grounded systems are grounded via parasitic capacitors. Power converters usually operate using pulse-width modulation (PWM) technology and have high switching speeds. This produces steep voltage edges. On account of the permanent voltage fluctuation between line and ground, current flows via the parasitic capacitors to ground on the basis of the equation $I=C \, \delta V/\delta t$.

A voltage between a DC cable and ground can change permanently, even on account of charging and discharging the line filter coils at the switching frequency. There are many techniques for reducing the leakage currents either by way of common-mode coils, such as in an EMC filter, or by using a motor cable shield, as a result of which low-impedance paths for leakage currents are produced.

In DC networks, a plurality of power converters are connected to the busbar, either on the feed-in side or on the load side. When, for example, two active front ends (AFEs) are connected to the busbar on the feed-in side, only one is operated in a grounded manner and the other in an ungrounded manner, since if both were to be grounded separately, both would continuously change the system voltage with respect to ground, and in step with their switching frequency. The switching frequency would produce a ground fault between the two grounding points and therefore trip a residual current circuit breaker (residual current device, RCD) without there being a fault.

By way of example, the described problem can be solved with a three-phase three-winding transformer, as a result of which there is no ground fault for the current. The problem can become critical if photovoltaic systems are added to the DC system since in many cases these have a separate grounding system. The aluminum frame is typically grounded to avoid contact voltages. Although the photovoltaic modules float, there are parasitic capacitors between the module and the aluminum frame. This produces a ground path current that can trip a residual current circuit breaker.

If the number of frequency converters on the feed-in side is increased, the leakage currents also increase significantly on account of the introduction of leakage capacitors on the load side. For the integration of a photovoltaic installation, this described problem can be solved by using the unidirectional solid state transformer (SST) technology or DC-DC transformers that electrically isolate the PV system. The same concept can also be used for power converters in order to reduce the common-mode current by means of a bidirectional DC-DC SST for each converter. A solution of this kind will reduce the common-mode current and eliminate the ground current path, but is extremely impractical and cost-intensive.

SUMMARY OF THE INVENTION

It is therefore an object of the invention to provide an electrical network that overcomes the mentioned problems in the event of a fault.

This object is achieved according to the invention by the electrical network described below; advantageous configurations of the electrical network according to the invention are specified in the dependent claims.

The electrical network according to the invention is equipped with feed-in means, loads and a distribution network, comprising at least one dynamic isolator and busbars, arranged therebetween, wherein the feed-in means and the loads, together with associated busbars, are arranged in groups that can be electrically connected to one another or disconnected from one another by means of the at least one dynamic isolator, wherein the at least one dynamic isolator monitors the voltage on the busbars adjacent thereto for a voltage difference, wherein, in the normal state without a voltage difference, the at least one dynamic isolator electrically disconnects the groups from one another, and wherein, if there is a voltage difference between the busbars adjacent thereto, the at least one dynamic isolator electrically connects the groups to one another.

It is advantageous in this case that the dynamic isolator electrically disconnects the groups from one another in the normal state, and there is therefore no power loss. Therefore, no common-mode currents can flow between the groups. The individual groups are electrically isolated from one another. There is therefore also no ground path, and therefore also no current between different grounding points. This allows a separate ground connection for all power converters. Another advantage is that there is increased system stability in the event of short-circuit faults, since the entire system does not have to be shut down altogether. Capacitor discharge of other groups is also prevented. In the event of maintenance of the power converters, the power flow of the loads can be controlled using the dynamic isolator, since controlled rectifiers are integrated therein. There is also additional protection in the case of grounding faults, since other groups would not contribute to the ground fault because they are isolated from one another in the normal state. Furthermore, various leakage current paths are blocked by way of the dynamic electrical isolation, which allows integration of a fault current detection means and also separate grounding of a power converter in each subsystem, if this is desired.

In one configuration of the electrical network according to the invention, the at least one dynamic isolator electrically connects the groups to one another if the voltage difference is greater than a predefined voltage difference threshold value.

In a further configuration, if there is a voltage difference between the busbars adjacent thereto, the at least one dynamic isolator disconnects the groups from one another again after connection if there is a fault in one of the adjacent groups.

In one configuration, it is repeatedly determined, in a time interval (Δt), whether there is a fault in one of the adjacent groups.

In one configuration of the electrical network according to the invention, a fault in one of the adjacent groups is assumed if the change in the voltage difference between the adjacent busbars exceeds a voltage change threshold value. Alternatively, a fault in one of the adjacent groups is assumed if a change in current through the at least one dynamic isolator exceeds a current change threshold value.

In one configuration of the electrical network according to the invention, the dynamic isolator disconnects the groups provided that no voltage difference arises across the dynamic isolator that is associated with a flow of power through the dynamic isolator and an imbalance between feed-in means and loads in a group.

In a further configuration of the electrical network, in the case of at least one dynamic isolator, the current is monitored for overload and the at least one dynamic isolator is protected in the event of overload.

In a further configuration, the electrical network is operated with direct current or alternating current.

In one configuration of the electrical network according to the invention, the at least one dynamic isolator comprises two anti-parallel solid-state transformers (SSTs) or active front ends (AFEs).

In a further configuration of the electrical network according to the invention, at least one electromechanical 6 switch is provided to disconnect a feed-in means or a load in the event of a fault.

The above-described properties, features and advantages of this invention and the manner in which they are achieved become clearer and more distinctly comprehensible in connection with the following description of embodiments, which are explained in more detail in connection with the figures.

BRIEF DESCRIPTION OF THE FIGURES

FIG. 1: shows a DC network having feed-in means and loads and dynamic isolators;

DETAILED DESCRIPTION OF THE INVENTION

Figure 2A:
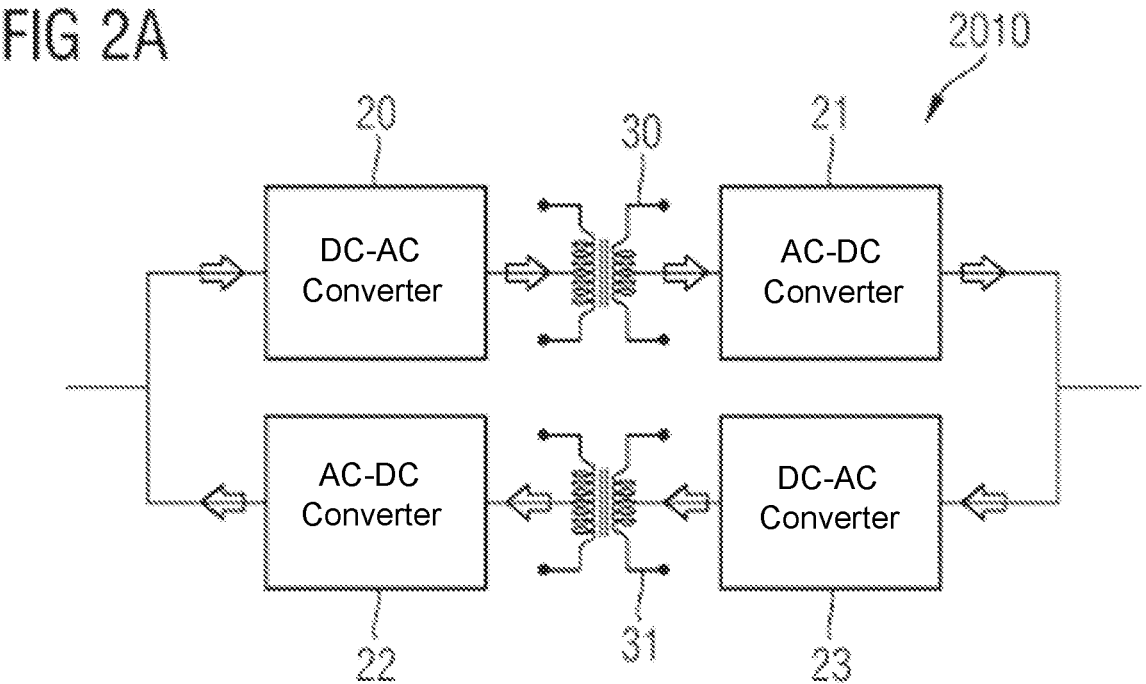
FIGS. 2A and 2B: show dynamic isolators for DC operation.

FIG. 1 shows an electrical network 1000 according to the invention. This electrical network 1000 comprises feed-in means 1010; 1011; 1012; 1013, loads 1050; 1051; 1052; 1053 and a distribution network 2000 arranged therebetween. This distribution network 2000 comprises at least one dynamic isolator 2010; 2011 and busbars 200, 200', 200". The feed-in means 1010; 1011; 1012; 1013 and the loads 1050; 1051; 1052; 1053, together with associated busbars 200, 200', 200", are arranged in groups, wherein these groups can be electrically connected to one another or disconnected from one another by means of the dynamic isolators 2010; 2011.

In accordance with FIG. 1, the feed-in means 1010 and the load 1050 form a first group on the busbar 200, the feed-in means 1011 and 1012 and the loads 1051 and 1052 form a second group together with the busbar 200' and the feed-in means 1013 and the load 1053 form a third group together with the busbar 200".

The busbar 200 of the first group is connected to the busbar 200' of the second group by means of a first dynamic isolator 2010, with the result that the first dynamic isolator 2010 can electrically connect the busbars 200, 200' to one another or disconnect them from one another. The same applies to the second dynamic isolator 2011 that is arranged between the busbar 200' of the second group and the busbar 200" of the third group and that can electrically connect said busbars to one another or disconnect them from one another.

The at least one dynamic isolator 2011; 2012 monitors the voltage on the busbars adjacent thereto for a voltage difference. Accordingly, the first dynamic isolator 2010 monitors the voltage difference from the busbar 200 of the first group to the busbar 200' of the second group, and the second dynamic isolator 2011 monitors the voltage difference from the busbar 200' of the second group to the busbar 200" of the third group.

In the normal state, which means that no voltage difference is detected by the dynamic isolator 2010; 2011 during monitoring, the at least one dynamic isolator 2010; 2011 electrically disconnects the groups from one another. By way of example, the first dynamic isolator 2010 would electrically disconnect the first group from the second group upon monitoring the busbars 200 and 200' without a voltage difference. The voltage on the busbars 200 and 200' could be 650 V in each case, for example, meaning that the voltage difference would be 0 V.

If a voltage difference between adjacent busbars 200; 200'; 200" is detected by the at least one dynamic isolator 2010; 2011; 2012, the groups are electrically connected to one another. If there is a dip in the voltage on a busbar 200, 200', 200", the at least one dynamic isolator 2010; 2011; 2012 in the distribution network 2000 ensures that adjacent groups are electrically connected to one another, and voltage dips can therefore be compensated for.

The voltage on the busbars 200 and 200' could be 650 V and 645 V, for example, meaning that the voltage difference would be 5 V and these two groups are connected to one another. Upon aligning the voltages on the busbars 200 and 200', for example to 650 V and 649 V, these two groups would be disconnected from one another again.

Provision can be made for the at least one dynamic isolator 2010; 2011; 2012 to electrically connect the groups to one another if the voltage difference is greater than a predefined voltage difference threshold value. By way of example, this voltage difference threshold value could be 5 V.

Provision can furthermore be made, if there is a voltage difference between the busbars 200, 200', 200" adjacent thereto, for the at least one dynamic isolator 2010; 2011; 2012 to electrically disconnect the groups from one another again after connection if there is a fault in one of the adjacent groups. Provision can be made here for it to be repeatedly determined, in a time interval Δt, whether there is a fault in one of the adjacent groups.

A fault in one of the adjacent groups can be assumed if the change in the voltage difference between the adjacent busbars 200, 200', 200" exceeds a voltage change threshold value. Likewise, a fault in one of the adjacent groups can be assumed if a change in current through the at least one dynamic isolator 2010; 2011; 2012 exceeds a current change threshold value.

The dynamic isolator 2010; 2011; 2012 can disconnect the groups provided that no voltage difference arises across the dynamic isolator 2010; 2011; 2012 that is associated with a flow of power through the dynamic isolator 2010; 2011; 2012 and an imbalance between feed-in means 1010; 1011; 1012; 1013 and loads 1050; 1051; 1052, 1053 in a group.

Provision can additionally be made, in the case of the at least one dynamic isolator 2010; 2011; 2012, for the current to be monitored for overload and the at least one dynamic isolator 2010; 2011; 2012 to be protected in the event of overload.

Figure 3:
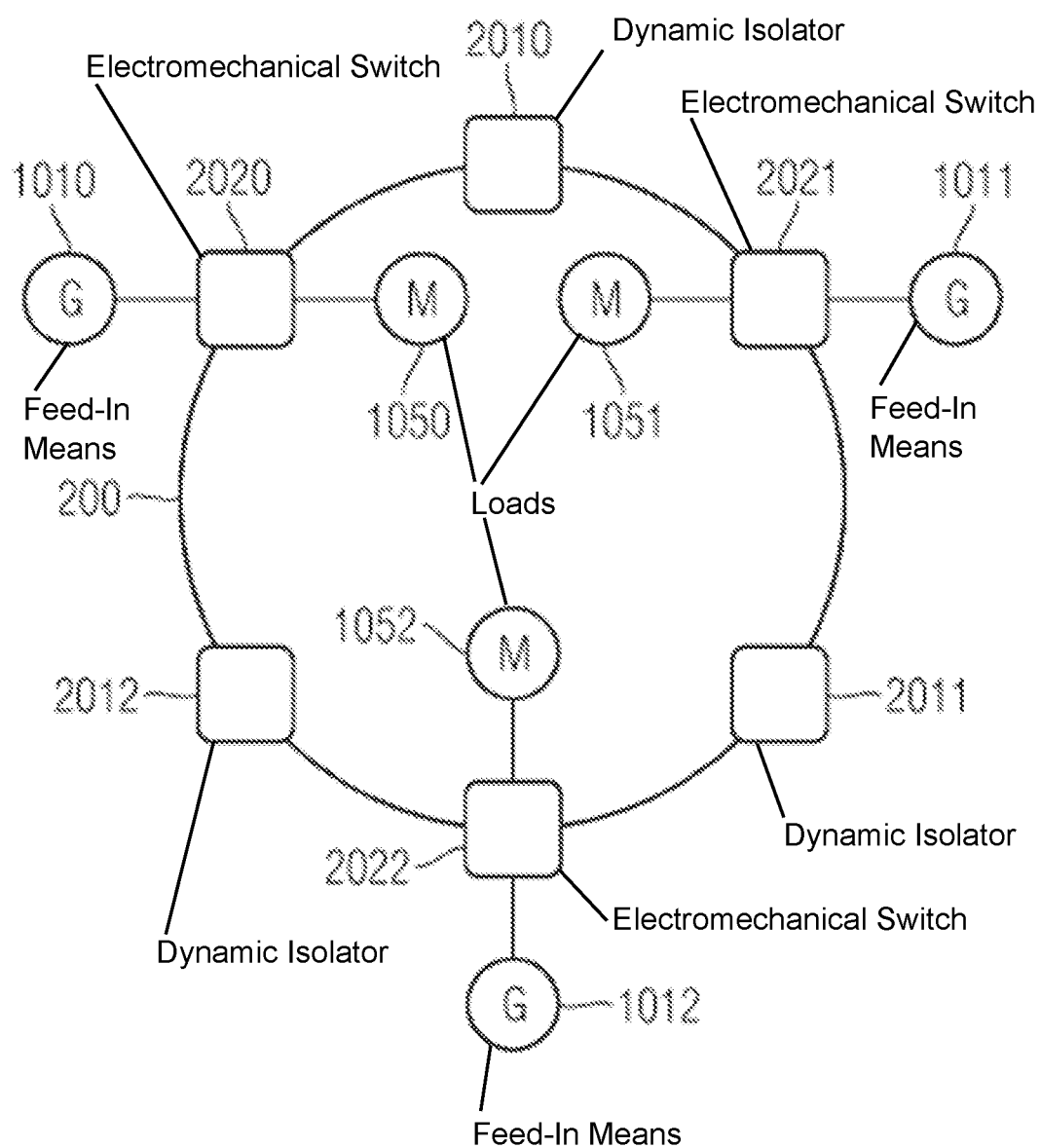
FIG. 3: shows an AC network having feed-in means and loads and dynamic isolators.

The electrical network 1000 according to the invention can be operated with direct current or alternating current. The exemplary embodiment in FIG. 1 is a typical example of an electrical network 1000 that is operated with direct current. FIG. 3 shows an electrical network 1000 that is operated with alternating current.

In accordance with FIG. 3, the network 1000 comprises feed-in means 1010; 1011; 1012 and loads 1050; 1051; 1052. Dynamic isolators 2010; 2011; 2012 can segment the busbar 200 into three groups, with a first group comprising the feed-in means 1010 and the load 1050, a second group having the feed-in means 1011 and the load 1051 and a third group having the feed-in means 1012 and the load 1052.

In this case too, the dynamic isolators 2010; 2011; 2012 monitor the voltage on the adjacent busbars 200 for a voltage difference. In the normal state without a voltage difference, the dynamic isolators 2010; 2011; 2012 electrically disconnect the three groups from one another. If a voltage difference between adjacent busbars 200 of the three dynamic isolators 2010; 2011; 2012 arises, the respective dynamic isolator 2010; 2011; 2012 electrically connects the groups to one another.

In the first exemplary embodiment for operating the electrical network 1000 according to the invention with direct current in accordance with FIG. 1, electromechanical switches 2020; 2021; 2022; 2023; 2024; 2025; 2026; 2027 are furthermore provided to disconnect the feed-in means 1010; 1011; 1012; 1013 or the loads 1050; 1051; 1052, 1053 in the event of a fault.

In the first group, the electromechanical switch 2020 is provided to disconnect the feed-in means 2010 from the busbar 200 in the event of a fault. Furthermore, the electromechanical switch 2021 is provided to disconnect the load 1050 from the busbar 200 in the event of a fault. In the topology of FIG. 3, electromechanical switches 2020; 2021; 2022 are also provided that can electrically disconnect the feed-in means 1010; 1011; 1012 or the loads 1050; 1051; 1052 from the busbar.

Figure 2B:
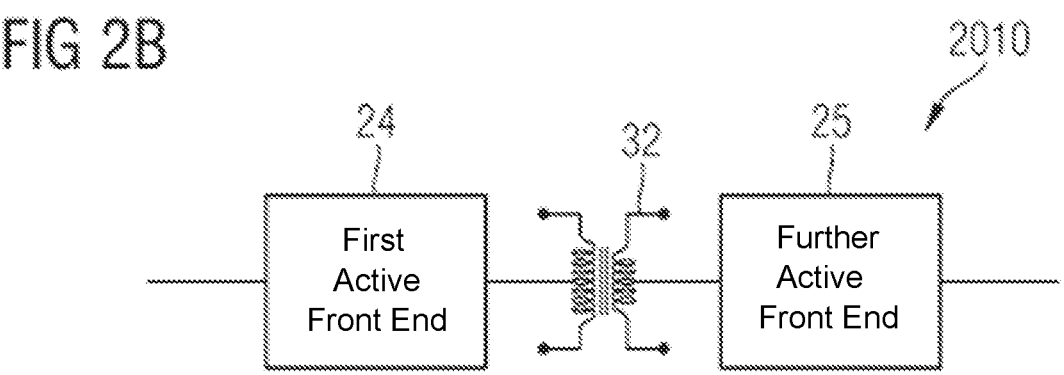

FIGS. 2A and 2B specify configurations of a dynamic isolator 2010 in a DC network. Two anti-parallel solid-state transformers (SSTs) are used in FIG. 2A. These comprise a DC-AC converter 20, a high-frequency transformer 30 and an AC-DC converter 21 in series, and a DC-AC converter 23, a transformer 31 and an AC-DC converter 22 for the parallel return path.

FIG. 2B shows a dynamic isolator 2010 that comprises a first active front end (AFE) 24, a transformer 32 and a further active front end (AFE) 25.

Figure 4A:
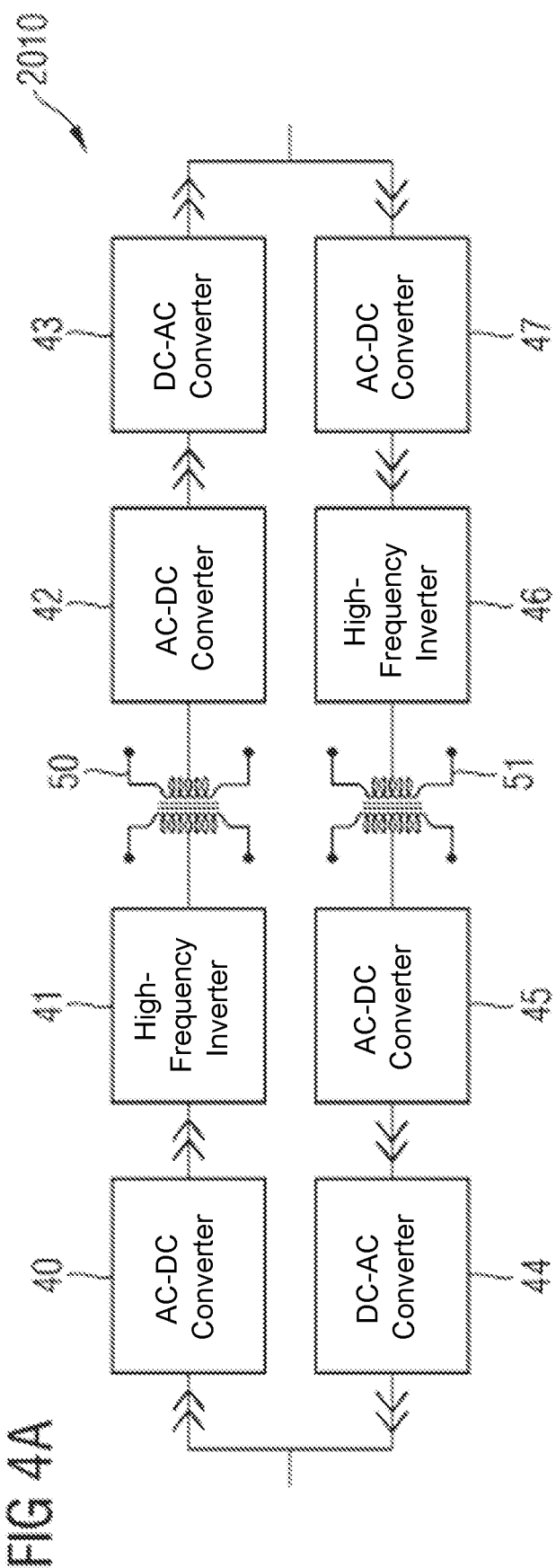
FIGS. 4A and 4B: show dynamic isolators for AC operation.
Figure 4B:
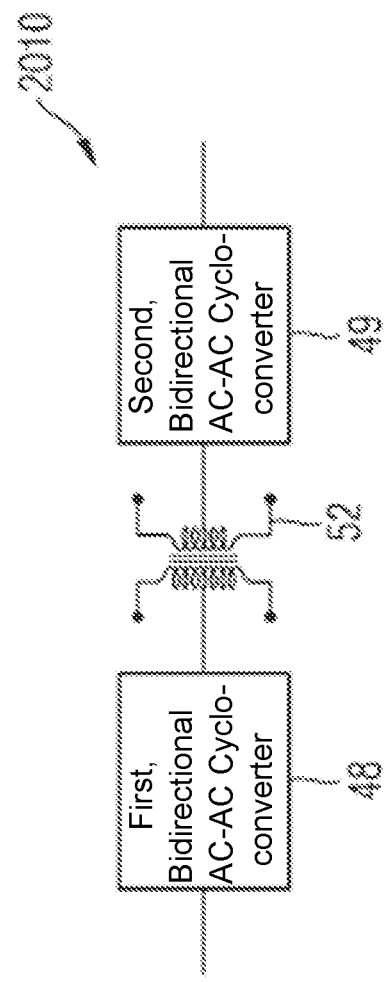

FIGS. 4A and 4B show exemplary embodiments of a dynamic isolator 2010 for an electrical network 1000 that is operated with alternating current. In FIG. 4A there are therefore, in series, an AC-DC converter 40 for the system frequency, a high-frequency inverter 41, a transformer 50, an AC-DC converter 42 and a DC-AC converter 43 for the system frequency. An AC-DC converter 47, a high-frequency inverter 46, a transformer 51, an AC-DC converter 45 and a DC-AC converter 44 are correspondingly provided for the parallel return path.

In the exemplary embodiment in FIG. 4B, the dynamic isolator 2010 comprises a series circuit comprising a first, bidirectional AC-AC cycloconverter 48, a transformer 52 and a second, bidirectional AC-AC cycloconverter 49.

The invention claimed is:

1. An electrical network, comprising:
   feed-in devices;
   loads; and
   a distribution network disposed between said feed-in devices and said loads, said distribution network including at least one dynamic isolator and busbars;
   said feed-in devices, said loads and said busbars being disposed in groups configured to be electrically connected to one another or disconnected from one another by said at least one dynamic isolator;

said at least one dynamic isolator monitoring voltage on adjacent busbars for a voltage difference;

in a normal state without the voltage difference, said at least one dynamic isolator electrically disconnecting said groups from one another;

upon the voltage difference occurring between adjacent said busbars, said at least one dynamic isolator electrically connecting said groups to one another; and said at least one dynamic isolator electrically connecting said groups to one another upon the voltage difference being greater than a predefined voltage difference threshold value.

2. An electrical network, comprising:

feed-in devices;

loads; and a distribution network disposed between said feed-in devices and said loads, said distribution network including at least one dynamic isolator and busbars;

said feed-in devices, said loads and said busbars being disposed in groups configured to be electrically connected to one another or disconnected from one another by said at least one dynamic isolator;

said at least one dynamic isolator monitoring voltage on adjacent busbars for a voltage difference;

in a normal state without the voltage difference, said at least one dynamic isolator electrically disconnecting said groups from one another;

upon the voltage difference occurring between adjacent said busbars, said at least one dynamic isolator electrically connecting said groups to one another; and upon a voltage difference occurring between said adjacent busbars, said at least one dynamic isolator electrically disconnecting said groups from one another again after connection, upon a fault occurring in one of said adjacent groups.

3. The electrical network according to claim 2, wherein said at least one dynamic isolator repeatedly determines, in a time interval, a presence of a fault in one of said adjacent groups.

4. The electrical network according to claim 2, wherein said at least one dynamic isolator assumes a fault in one of said adjacent groups upon a change in the voltage difference between said adjacent busbars exceeding a voltage change threshold value.

5. The electrical network according to claim 2, wherein said at least one dynamic isolator assumes a fault in one of said adjacent groups upon a change in current through said at least one dynamic isolator exceeding a current change threshold value.

6. An electrical network, comprising:

feed-in devices;

loads; and a distribution network disposed between said feed-in devices and said loads, said distribution network including at least one dynamic isolator and busbars;

said feed-in devices, said loads and said busbars being disposed in groups configured to be electrically connected to one another or disconnected from one another by said at least one dynamic isolator;

said at least one dynamic isolator monitoring voltage on adjacent busbars for a voltage difference;

in a normal state without the voltage difference, said at least one dynamic isolator electrically disconnecting said groups from one another;

upon the voltage difference occurring between adjacent said busbars, said at least one dynamic isolator electrically connecting said groups to one another; and said at least one dynamic isolator disconnecting said groups provided that no voltage difference arises across said at least one dynamic isolator being associated with a flow of power through said at least one dynamic isolator and an imbalance between said feed-in devices and said loads in a group.

7. An electrical network, comprising:

feed-in devices;

loads; and a distribution network disposed between said feed-in devices and said loads, said distribution network including at least one dynamic isolator and busbars;

said feed-in devices, said loads and said busbars being disposed in groups configured to be electrically connected to one another or disconnected from one another by said at least one dynamic isolator;

said at least one dynamic isolator monitoring voltage on adjacent busbars for a voltage difference:

in a normal state without the voltage difference, said at least one dynamic isolator electrically disconnecting said groups from one another;

upon the voltage difference occurring between adjacent said busbars, said at least one dynamic isolator electrically connecting said groups to one another; and said at least one dynamic isolator monitoring current for overload and said at least one dynamic isolator being protected in an event of an overload.

8. The electrical network according to claim 1, wherein the electrical network is operated with direct current or alternating current.

9. An electrical network, comprising:

feed-in devices;

loads; and a distribution network disposed between said feed-in devices and said loads, said distribution network including at least one dynamic isolator and busbars;

said feed-in devices, said loads and said busbars being disposed in groups configured to be electrically connected to one another or disconnected from one another by said at least one dynamic isolator;

said at least one dynamic isolator monitoring voltage on adjacent busbars for a voltage difference;

in a normal state without the voltage difference, said at least one dynamic isolator electrically disconnecting said groups from one another;

upon the voltage difference occurring between adjacent said busbars, said at least one dynamic isolator electrically connecting said groups to one another; and said at least one dynamic isolator including two antiparallel solid-state transformers or active front ends.

10. The electrical network according to claim 1, which further comprises at least one electromechanical switch configured to disconnect one of said feed-in devices or one of said loads in an event of a fault.

* * * * *